United States Patent [19]

Ruangburapa

[11] 4,378,731
[45] Apr. 5, 1983

[54] NUT CRACKING DEVICE

[76] Inventor: Suwat Ruangburapa, P.O. Box 2263, Norman, Okla. 73070

[21] Appl. No.: 182,806

[22] Filed: Aug. 29, 1980

[51] Int. Cl.³ .............................................. A23N 5/00
[52] U.S. Cl. ...................................... 99/571; 99/577; 99/580
[58] Field of Search ................. 99/568, 571, 572, 574, 99/577, 578, 580, 581, 582, 583, 565; 221/241, 265; 222/305

[56] References Cited

U.S. PATENT DOCUMENTS

| | | | |
|---|---|---|---|
| 642,814 | 2/1900 | Cowen | 99/565 X |
| 807,052 | 12/1905 | Werner | 99/580 |
| 842,398 | 1/1907 | Gebhardt | 99/572 |
| 947,932 | 2/1910 | Peckham | 99/577 |
| 1,598,076 | 8/1926 | Galleazzi | 99/568 X |
| 1,767,917 | 6/1930 | Demek | 99/580 |
| 2,765,830 | 10/1956 | Guenther | 99/572 |
| 2,783,802 | 3/1957 | Fontaine | 99/580 |
| 2,827,087 | 3/1958 | Connor | 99/583 X |

Primary Examiner—Harvey C. Hornsby
Assistant Examiner—Joseph M. Pitko
Attorney, Agent, or Firm—Christopher H. Morgan

[57] ABSTRACT

A nut cracking device commprising a hammer having an opening for receiving the end of a nut and applying columnar pressure thereon and a plate which faces the hammer for receiving the opposite end of the nut and applying columnar pressure thereon. A spring urges the hammer toward the plate in a cracking process wherein a rotating shaft repeatedly draws and releases the hammer. A turntable, also motivated by the rotating shaft, has an opening for receiving a nut from a reservoir of nuts and transferring that nut to a rest disposed between the hammer and the plate. The rotating shaft also motivates the rest to pivot allowing the nut to fall from the rest after it has been cracked.

8 Claims, 17 Drawing Figures

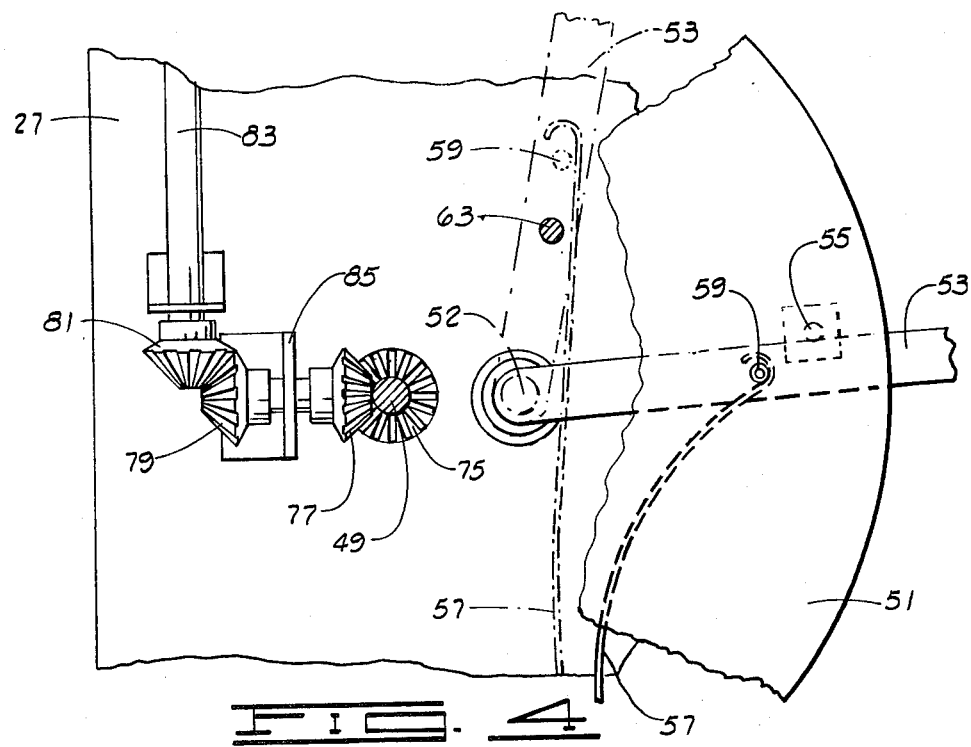
FIG. 4
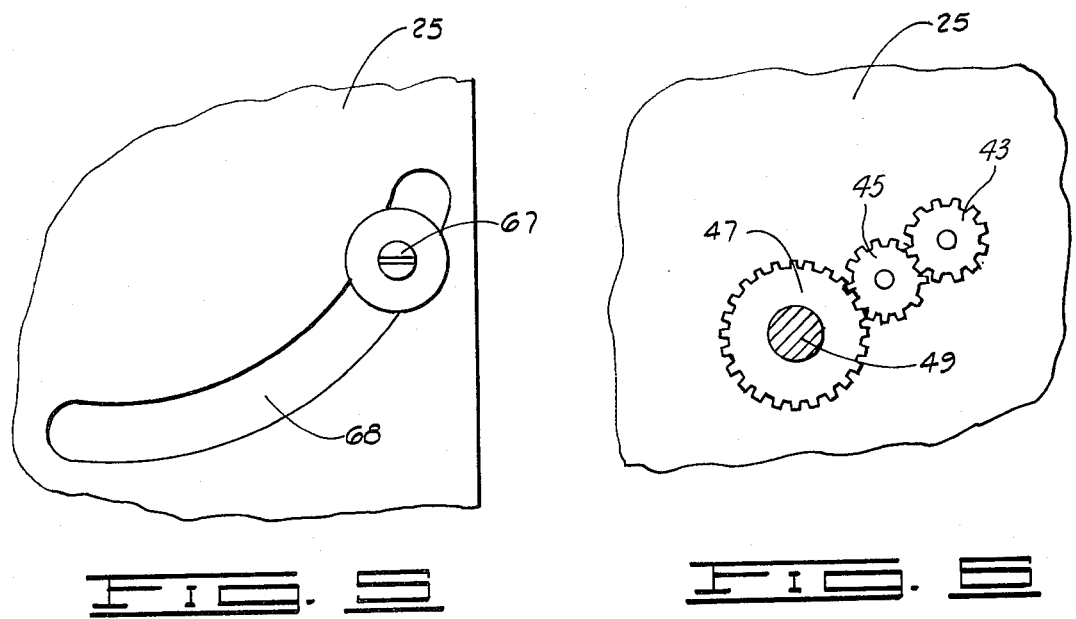
FIG. 5
FIG. 6

NUT CRACKING DEVICE

BACKGROUND OF THE INVENTION

1. Field of the Invention

This invention relates in general to devices and equipment for cracking the shell of a nut.

2. Description of the Prior Art

In the past there have been a wide variety of devices utilized to crack nuts. The object of all these devices is to allow the shell to be separated from the edible meat portions of the nut. Some of these devices are machine operated to automatically and continuously load and crack nuts. Others are operated manually in either the loading process or the application of force to crack the nut.

Machines which automatically operate to load nuts into a position for cracking are shown in U.S. Pat. Nos. 676,187 to Grimm; 807,052 to Warner; 947,932 to Peckham; and 3,422,865 to Barrow. Each of these devices loads the pecan into a nut cracking position by mechanically orienting the nut into a cylindrical opening. The cylindrical opening is sized such that the nut will fit lengthwise through the opening and can enter in no other way. A disadvantage of the cylindrical opening is that it accomodates only one size of nut. Another disadvantage is that irregularities in the nut size and shape can clog the machine. Still another disadvantage is that the nut must be agitated or otherwise moved and oriented to allow the nuts to enter lengthwise into the cylindrical opening.

The prior art also shows a variety of ways for cracking the shell of the nut. U.S. Pat. No. 676,187 to Grimm shows a set of saws which are used to cut the shell at spaced locations around the nut allowing the nut to be opened with a slight pressure applied to the edges of the nut. Other devices such as U.S. Pat. No. 947,392 to Peckham operate to crack the shell of the nut by applying pressure to the sides of the nut. As shown by the Peckham patent many of these devices which operate to crack the nut by applying pressure to the sides of the nut have the pressure applying portion specifically shaped to conform to the side of the nut to be cracked.

U.S. Pat. No. 397,863 to Kuhlmann shows a device wherein a hammer is continuously operated to impact the side portion of a nut held in a reservoir location. The hammer is prevented from smashing the nut by a collar which stops the travel of the hammer.

U.S. Pat. No. 3,422,865 to Barrow shows a device which cracks the nut shell by applying pressure to the ends of the shell. In this process a cam moves a piston forwardly to engage and then crush the end of the shell. The opposite end of the shell is held in place by a stationary piston and lateral movement of the nut is prevented by a cylindrical wall which encloses the nut.

U.S. Pat. No. 3,713,468 to Walsh describes another device wherein pressure is applied to the ends of the nut in the cracking process. As with the Barrow device the Walsh device retains the nut within a cylindrical wall as the pressure is applied. The Walsh device utilizes a manually moved piston to engage the ends of the nut. The opposite end of the nut is held in place by a fixed jaw. After the nut has been cracked, the cylinder containing the nut is withdrawn and a nut rest pivots downwardly to allow the nut to fall into a drawer for retaining the cracked nuts.

A disadvantage of each of the above devices utilized in cracking nuts is that the pressure applied to crack the nut shell tends to crush the meat as well as the shell. This is especially a problem when nuts of different sizes are positioned in the nut cracker. Small nuts tend to reduce the amount of cracking force applied such that the nuts are not completely cracked and the shell cannot be separated from the meat. On the other hand, large nuts increase the cracking force such that the meat is crushed.

Another disadvantage of the prior art is that the nut must be precisely positioned to prevent improper application of the cracking force. This orientation is often provided by means of a cylindrical opening which can be clogged with cracked or uncracked nuts.

Still another problem with the prior art has been accommodating different types of nuts. Since different types of nuts have shells of varying hardness and thickness as well as varying sizes and shapes, the nut crackers of the prior art have not been satisfactory in accommodating different kinds of nuts. This is especially true where nuts are automatically loaded into the nut cracking position.

Another problem in the prior art has been that the machines used to automatically and continuously crack nuts have been extremely complicated and tend to malfunction requiring complicated repairs.

SUMMARY OF THE INVENTION

It is accordingly an object of the present invention to provide an improved nut cracking device. More particularly, it is an object of the present invention to provide such an improved device having an improved means for loading the nuts into a nut cracking position and also having an improved apparatus for cracking the nut. The present invention also provides an improved means for unloading the cracked nut from the nut cracking position.

Another object of the present invention is to provide a nut cracking device which can accommodate a variety of shell sizes and also accommodate different types of nuts. This accommodation of different sizes and types of nuts is provided for the means for loading the nut into a nut cracking position, the means for applying the nut cracking force, and the means for unloading the nut for the nut cracking position.

Another object of the present invention is to provide a nut cracking device which applies the nut cracking force in an improved manner.

Still another object of the present invention is to provide a nut cracking device having an improved means for loading the nuts into the nut cracking position.

Still another object of the present invention is to provide a nut cracking device which automatically loads the nut into a nut cracking position, applies a force such that the nut is cracked and unloads the nut from the nut cracking position. This device has a simple construction and yet an improved function over the prior art devices which attempt to perform the same functions.

In accordance with the objects, the nut cracking device of the present invention comprises a first member having an opening for receiving the end of a nut and applying columnar pressure thereon. A hammer member having an opening for receiving the end of a nut therein and applying columnar pressure thereon is disposed in relation to the first member such that a nut can be positioned between the first member and the hammer member in the process of cracking the nut. The device includes a means for applying an impacting force to the hammer member in the process of cracking a nut disposed between the first member and the hammer member.

A supporting means supports the nut between the first member and the hammer member. This support means preferably includes a rest for receiving the nut in a proper orientation.

The present invention also includes a means for automatically removing cracked nuts from the supporting means. Preferably, this comprises a device for pivoting the rest to cause the nut to fall from the rest following the cracking process.

Also provided is a means for automatically positioning a nut on the supporting means. Preferably this includes a means for transferring a nut from a reservoir, means for orienting this nut, and means for positioning this oriented nut on the supporting means.

For a further understanding of the invention and further objects, features and advantages thereof, reference may now be had to the following description taken in conjunction with the accompanying drawings.

BRIEF DESCRIPTION OF THE DRAWINGS

FIG. 1 is a front elevational view of the nut cracking device of the present invention.

FIG. 2 is a back elevation view of the device in FIG. 1.

FIG. 3a is a cross-sectional view of a portion of the device shown in FIG. 1.

FIG. 3b is a cross-sectional view of the same portion of the device as shown in FIG. 3a taken along the lines shown in FIG. 3a.

FIG. 4 is a partial cross-sectional view of the device shown in FIG. 1.

FIG. 5 is a side elevational view of a portion of the housing of the device shown in FIG. 1.

FIG. 6 is a cross-sectional view of a portion of the device shown in FIG. 1.

DESCRIPTION OF PREFERRED EMBODIMENT

Figures 1, 2, 3A, 3B:
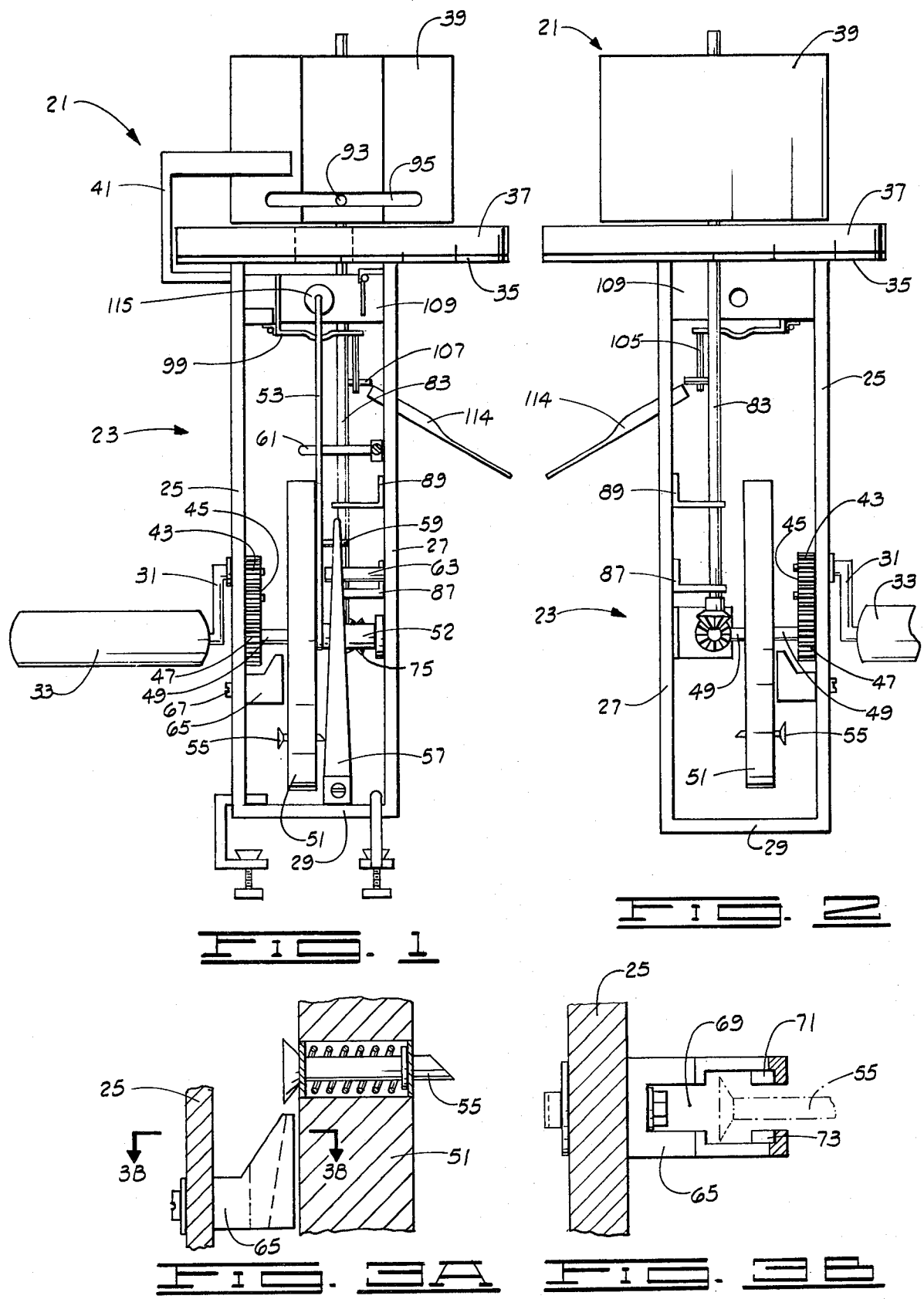

Referring now to FIGS. 1 and 2, the nut cracker of the present invention is shown generally at 21. The nut cracker 21 has a housing 23 comprised of side walls 25 and 27 and base 29. A crank 31 is attached to side wall 25 and is provided with a handle 33 to allow manual operation of the nut cracker 21. C-clamps are shown for attaching base 29 to a planar surface such as a table top.

Attached to the upper ends of side walls 25 and 27 is a fixed disk 35. A rotating disk or turntable 37 is disposed on top of the fixed disk 35. Turntable 37 has the same diameter as disk 35 and is attached for rotation such that turntable 37 continuously mates with and rotates on top of disk 35.

Disposed above turntable 37 is a reservoir 39. The reservoir 39 receives the nuts to be cracked and is open on its lower end to communicate with turntable 37. Reservoir 39 is held in place by an arm 41 connected on one end to the outer side of reservoir 39 and at the other end to side wall 25. Arm 41 extends around turntable 37 and disk 35. As can be seen, arm 41 retains reservoir 39 in a fixed position above turntable 37 such that reservoir 39 does not rotate when turntable 37 is rotating. The spacing between reservoir 39 and turntable 37 must be such that nuts can not escape as the turntable rotates.

Crank 31 is connected to a gear 43 disposed on the interior of side wall 25. Gear 43 is disposed such that it engages a middle gear 45 which in turn engages a drive gear 47. Middle gear 45 is attached for rotation to side wall 25. Drive gear 47 is attached to a shaft 49 which is journalled on its ends to side walls 25 and 27. Gears 43, 45 and 47 cooperate such that rotation of crank 31 rotates shaft 49. Of course, the relative speed of rotation of shaft 49 and crank 41 is determined by the sizes of gears 43, 45 and 47. Changing the number of gears in this gear combination will change the direction of rotation of shaft 49 with respect to the rotation of crank 31.

Attached to a central portion of shaft 49 is a disk 51. Disk 51 is attached to shaft 49 so that it rotates with shaft 49.

Attached to side wall 27 is a bushing and shaft 52 which, in turn, is connected to a hammer arm 53. Hammer arm 53 is held by bushing and shaft 52 such that it pivots adjacent disk 51.

A pin 55 extends through an outer portion of disk 51 such that one end of pin 55 can extend to contact hammer arm 53 as disk 51 rotates. When the end of pin 55 engages hammer arm 53 then hammer arm 53 is caused to pivot about shaft 52 concurrently with the rotation of disk 51.

Attached to base 29 is a flat spring 57. Spring 57 extends vertically and is tapered from its base to its upper end. Attached midway along the side of hammer arm 53 is a projection 59 which engages the upper end of flat spring 57. As hammer arm 53 pivots toward spring 57 the projection 59 draws the upper end of spring 57 into a tension state. Thus, as hammer arm 53 pivots toward spring 59, spring 59 urges hammer arm 53 in the opposite direction.

Extending from the inside of side wall 27 is a spring arm 61. Spring arm 61 is disposed so it will engage hammer arm 53 as hammer arm 53 moves away from flat spring 57. Spring arm 61, therefore, operates to urge hammer arm 53 toward flat spring 57.

Also extending from the interior of side wall 27 is a rigid arm 63. Arm 63 is disposed such that it engages and limits the travel of flat spring 57. Arm 63 is disposed on the same side of flat spring 57 as projection 59.

Attached to the interior of side wall 25 is a cam piece 65. Cam piece 65 receives the beveled head of pin 55 to disengage the end of pin 55 from hammer 53. This disengagement causes hammer arm 53 to spring forwardly as urged by flat spring 57. Cam piece 65 is connected to side wall 25 by a bolt 67. As shown in FIG. 5, bolt 67 is received through a slot 68 in wall 25 such that the position of cam piece 65 can be altered. This alteration of the position of cam piece 65 changes the location at which pin 55 is disengaged from hammer arm 53. This changes the amount of force with which hammer 53 is thrown forward.

Referring to FIGS. 3a and 3b, cam piece 65 and pin 55 are shown in more detail. As shown in FIG. 3b, cam piece 65 has a slot 69 which can receive the head of pin 55 therethrough. The head of pin 55 is beveled and rides up on cam surfaces 71 and 73 as the head of pin 55 passes through slot 69.

As shown in FIG. 3a, pin 55 is spring loaded in disk 51. The spring is disposed to urge the pin toward the hammer 53. At its greatest travel in this direction, the beveled head of pin 55 extends outwardly from disk 51 such that the beveled head is engaged by cam surfaces 71 and 73 as the bevel is received in slot 69. As the beveled head of pin 55 rides up on cam surfaces 71 and 73 the end of pin 55 disengages from hammer arm 53. After pin 55 has passed cam piece 65 it springs back so that the end of pin 55 extends outwardly from disk 51 and will again engage hammer arm 53 when it is rotated to that position.

Referring now to FIGS. 1, 2 and 4 it can be seen that rotation of crank 31 causes a repeated drawing and releasing of hammer arm 53. Rotation of crank 31 causes shaft 49 and disk 51 to rotate. Disk 51 rotates freely until the end of pin 55 engages hammer arm 53 which is located in a vertical position. The engagement of pin 55 with hammer arm 53 causes hammer arm 53 to pivot about shaft 52. This pivoting of hammer arm 53 is resisted by flat spring 57 which engages projection 59. As disk 51 rotates further the beveled head of pin 55 encounters cam piece 65. This causes the end of pin 55 to be withdrawn from engagement with hammer arm 53. Once hammer arm 53 is released, spring 57 throws hammer arm 53 forwardly. Spring 57 continues to throw hammer arm 53 forwardly until it engages rigid arm 63. Hammer arm 53 continues to move forwardly until it reaches the end of its travel.

The forward travel of hammer arm 53 is usually limited by the process of cracking a nut. This process will be described in more detail below.

After hammer arm 53 reaches the limit of its forward travel it is urged back toward flat spring 57 by spring arm 61. After spring arm 61 has moved hammer arm 53 back into engagement with flat spring 57, hammer arm 53 remains stationary until contacted again by pin 55. The regular rotation of disk 51 by crank 31 repeatedly draws and releases hammer 53.

Connected to the end of shaft 49 adjacent side wall 27 is a bevel gear 75. Bevel gear 75 is connected to a second bevel gear 77 shown in FIG. 4. Bevel gear 77 is attached by a shaft to a third bevel gear 79. Bevel gear 79 meshes with a fourth bevel gear 81. A vertically disposed shaft 83 is connected to bevel gear 81. The combination of bevel gears 75, 77, 79 and 81 transfers the rotational action of horizontal shaft 49 to rotation of vertical shaft 83.

The shaft between the bevel gears 77 and 79 is journalled in a bracket 85 which is connected to side wall 27. Similarly, shaft 83 is journalled in brackets 87 and 89 which are also connected to side wall 27.

The upper end of shaft 83 passes through a central hole in fixed disk 35 and is connected to turntable 37. It also passes through a hole vertically disposed in one wall of reservoir 39.

Figure 7:
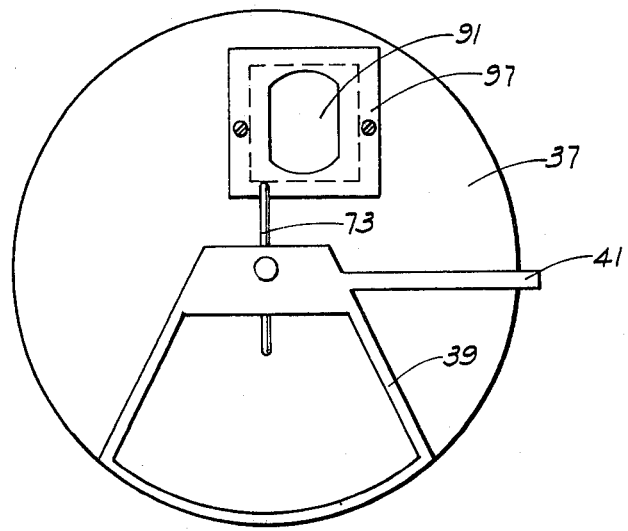
FIG. 7 is a top elevational view of the device shown in FIG. 1.

As shaft 83 rotates, it causes turntable 37 to rotate at the same rate. As shown in FIG. 7, turntable 37 has an opening 91 for receiving a nut from reservoir 39 as the opening 91 passes beneath reservoir 39. Fixed disk 35 also has an opening which mates with opening 91 when a nut in opening 91 is disposed directly above the nut cracking position. Reservoir 39 is located above turntable 37 and fixed disk 35 opposite the nut cracking position such that rotation of turntable 37 transfers a single nut from reservoir 39 to a nut cracking position.

As turntable 37 rotates, opening 91 passes beneath reservoir 39 which is disposed above one side of turntable 37. The nuts in reservoir 39 are contacting the surface of turntable 37 as the turntable rotates. This causes the nuts to rotate with the turntable and orient themselves so that it is likely that a nut will fall into opening 91 as turntable 37 rotates. When a nut falls into opening 91 from reservoir 39, it is retained in opening 91 because it is supported by fixed disk 35 which is directly beneath turntable 37. The thickness of turntable 37 is such that after a nut falls into opening 91 and is held therein, the nut passes beneath reservoir 39 while the remaining nuts in reservoir 39 are retained. However, turntable 37 is not so thick that two nuts can fall into opening 91 at the same time. As the nut in opening 91 is carried with the rotation of turntable 37 it finally resides above the mating opening in fixed disk 35. This allows the nut in opening 91 to fall into the nut cracking position.

The shape of opening 91 is importance since the nut must fall into the nut cracking position in a particular orientation. Therefore, the shape of opening 91 must be such that the nut is in that particular orientation when the nut reaches the opening in fixed disk 35.

Attached to shaft 83 above turntable 37 is a rod 93. Rod 93 extends perpendicularly from shaft 83 and passes through a slot 95 in reservoir 39. As rod 93 rotates with shaft 83, it passes through reservoir 39. As it does so, it stirs the nuts in reservoir 39 to prevent a clogging orientation of the nuts in reservoir 39 that will not allow a nut to fall into hole 91 as hole 91 passes beneath reservoir 39.

In order to accommodate different sizes and shapes of nuts, it is desirable to change the size and shape of hole 91. As shown in FIGS. 7, 8, 9 and 10 one means for achieving this variation in shape and size of hole 91 is to provide turntable 37 with a plurality of slotted inserts 97. Inserts 97 have a shoulder portion which is received by a mating shoulder on the turntable 37. Screws can be used to attach insert 97 to turntable 37. Alternatively, inserts 97 could be slidably received into grooves in turntable 37.

FIG. 7 shows an insert 97 having an opening 91 suitable for a pecan. The opening 91 for a pecan is generally rectangular in shape but with rounded ends. The length dimension of this opening should be approximately 1.7 inches. The width dimension should be approximately one inch. This size opening will allow an average size pecan to be received in the opening with an orientation to fall into the pecan cracking position properly.

Figures 8, 9:
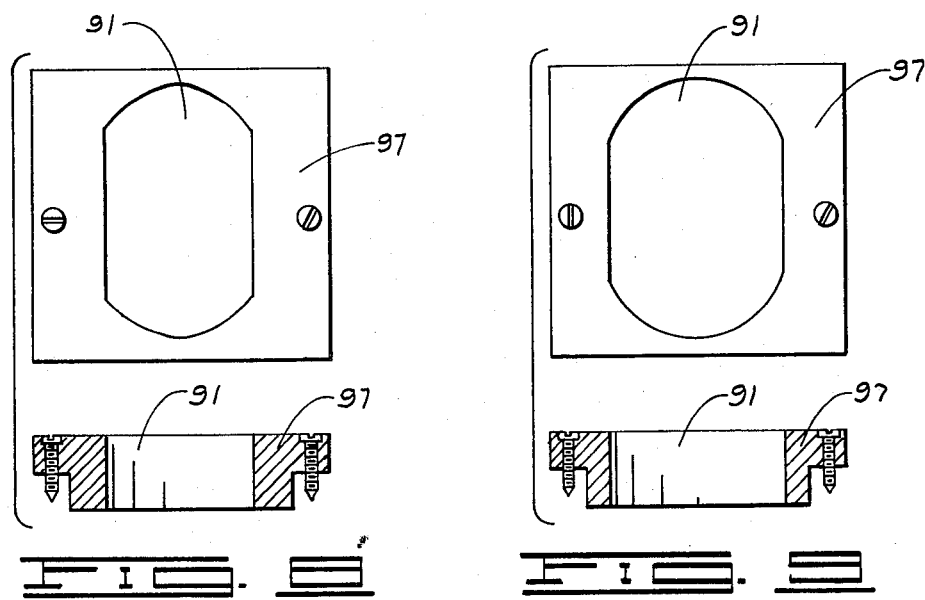
FIG. 8 is a top and cross-sectional view of a removable piece of the device shown in FIG. 1.
FIG. 9 is a top elevational and cross-sectional view of a removable piece of the device shown in FIG. 1.

FIG. 8 shows an insert 97 having an opening 91 suitable for retaining an english walnut or a chestnut. The shape of opening 91 in this insert is generally the same as the insert for a pecan but the width is slightly larger. The width dimension of an opening 91 for an english walnut should be approximately 1.2 inches and the height dimension should be approximately 1.9 inches.

Figure 10:
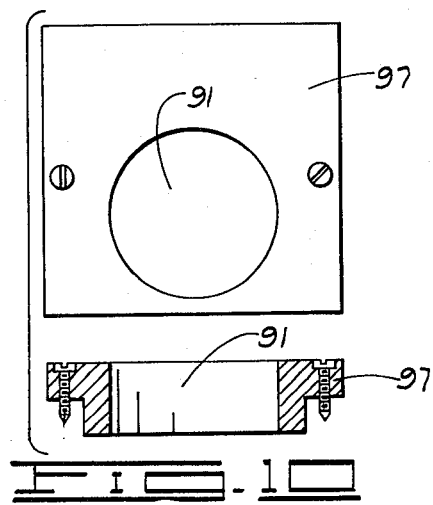
FIG. 10 is a top elevational and a cross-sectional view of a removable piece of the device shown in FIG. 1.

The insert shown in FIG. 10 is provided with an opening 91 suitable for a hazel nut. The hazel nut opening should be round and have a diameter of approximately 1.1 to 1.2 inches.

Figure 11:
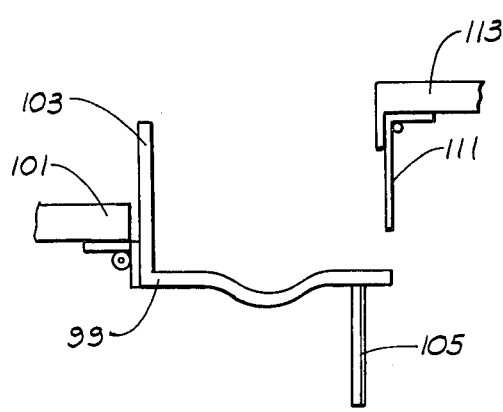
FIG. 11 is a front elevational view of a portion of the device shown in FIG. 1.

Referring now to FIGS. 1, 2 and 11, it can be seen that a nut which falls from opening 91 falls onto a shelf or rest 99. Rest 99 has an indentation or groove which extends from the front to the back of the rest for receiving the nut in a proper orientation. This indentation helps to maintain the proper orientation after the nut falls to the rest. A bracket and hinge 101 connect rest 99 to side wall 25. Bracket and hinge 101 are connected so that the end of rest 99 opposite bracket and hinge 101 can pivot downwardly allowing a cracked nut to fall from the rest. Hinge 101 contains a spring which urges rest 99 upwardly toward a horizontal position. A side plate 103 extends vertically from the side of rest 99 adjacent bracket and hinge 101 to retain the cracked pieces of the nut which fly away from the nut location during the cracking process. Side plate 103 also acts to clear the nut from the nut cracking position when the rest 99 pivots downwardly.

Connected to the underneath of rest 99 is a cam rod 105. This rod 105 extends vertically downward from the underside of rest 99 opposite bracket and hinge 101. Cam rod 105 extends parallel to and spaced from shaft 83.

Extending radially outward from shaft 83 is a drive rod 107 which engages cam rod 105 as shaft 83 rotates. As drive rod 107 engages cam rod 105, it causes rest 99 to pivot downwardly about bracket and hinge 101. This continues until the rotation of shaft 83 and rod 107 disengages drive rod 107 from cam rod 105. This frees rest 99 and the spring loaded hinge of bracket and hinge 101 returns rest 99 to its horizontal position.

Behind rest 99 is an impact plate 109. The ends of impact plate 109 are connected to sidewalls 25 and 27. Impact plate 109 is disposed between rest 99 and shaft 83 and receives and retains one end of the nut during the cracking process.

Opposite side plate 103 and adjacent the side of rest 99 is a retainer plate 111. Retainer plate 111 is connected to a bracket 113 which in turn is connected to side wall 27. Like side plate 103 retainer plate 111 serves to retain the particles which fly away from a nut in the cracking process within the nutcracking area above rest 99.

As can be seen, rest 99, side plates 103 and retainer plate 11 provide a nut rest which can accommodate a variety of nut sizes and shapes.

Beneath and to the side of rest 99 is a chute 114. Chute 114 is connected to side wall 27 and extends through a hole in side wall 27. Chute 114 is slanted downward from its upper end beneath the rest 99 to its lower end extending from the side of side wall 27. Chute 114 is disposed to receive a nut falling from rest 99 when rest 99 is pivoted downwardly by the action of drive rod 107 on cam rod 105.

Figure 12:
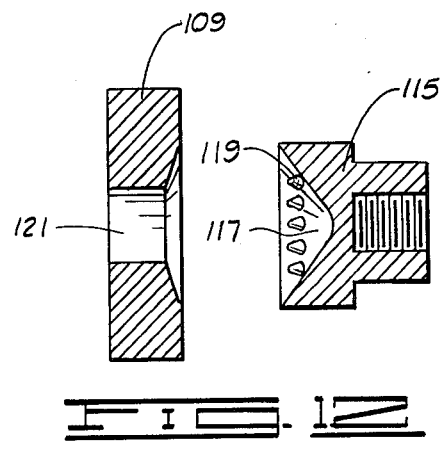
FIG. 12 is a side cross-sectional view of two portions of the device shown in FIG. 1.
Figure 13:
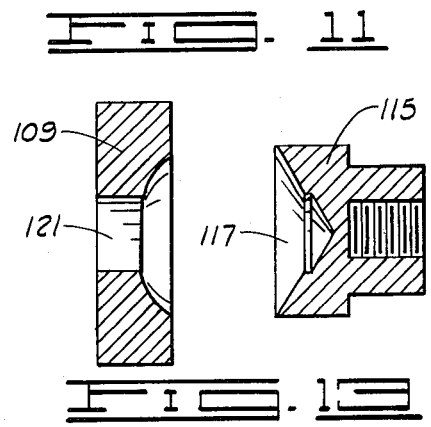
FIG. 13 is a side cross-sectional view of an alternate embodiment of the two portions shown in FIG. 12.

Referring now to FIGS. 12 and 13, a hammer head 115 is threadedly attached to the end of hammer arm 53. As shown in FIG. 12, hammer head 115 has an opening 117 for receiving the end of a nut in the cracking process. Opening 117 is shaped such that when the hammer head 115 contacts a nut in the cracking process, it does so only about the edges of the nut. Thus, no force is applied to the extreme end of a nut by hammer head 115 when hammer head 115 contacts the nut. Instead, a columnar force is applied to the sides of the nut about the end of the nut. As shown in FIG. 12, hammer head 115 has a plurality of teeth 119 disposed in a circle inside the conical opening 117. Teeth 119 are disposed so that when hammer head 115 contacts a nut, the teeth 119 encounter and crack the nut in a circular pattern about the end of the nut. The extreme end portion of the conical opening 117 does not contact the nut. As the nut is cracked, the end of the nut expands into the tip of the conical opening 117.

An alternate embodiment of hammer head 115 is shown in FIG. 13. In this embodiment no teeth are provided on the interior of conical opening 117. Although without teeth, opening 117 is shaped so that the walls of opening 117 contact the side portions of the end of the nut inserted in the opening. The tip of the conical opening 117 is further indented to allow expansion of the extreme end of the nut as the nut is cracked.

Opposite the opening 117 in hammer head 115 is an opening 121 in impact plate 109. As opening 117 receives one end of a nut in the cracking process opening 121 receives the opposite end of the nut. Like opening 117, opening 121 has a conical shape to apply a columnar force to the sides of a nut being cracked. At the tip of conical opening 121 is a bore which extends completely through impact plate 109. This bore allows the extreme end of a nut received in opening 121 to expand in the cracking process.

As shown in FIG. 12, the sides of conical opening 121 are flat. In the embodiment shown in FIG. 13, however, the sides of conical opening 121 are rounded. In either case, the opening 121 receives the nut so that the extreme end of the nut can expand into the bore at the end of opening 121 and a columnar force is applied to the side of the nut.

In the process of cracking a nut, hammer head 115 impacts the side portions of one end of the nut and impact plate 109 encounters the side portions of the opposite end of the nut. The force of impact is directed axially along the nut. This causes the sides of the nut to buckle and the ends of the nut to expand outwardly. Thus, an impact force is applied along a columnar portion of the nut. This removes most of the crushing effect on the meat inside the shell of the nut.

As can be seen, buckling of the nut along the columnar sides of the nut cracks the nut in such a way that the meat is not damaged and yet the shell is completely cracked allowing easy separation of the shell from the meat. Of course, there are many ways to shape the openings 117 and 121 to apply force in this manner.

Figure 14:
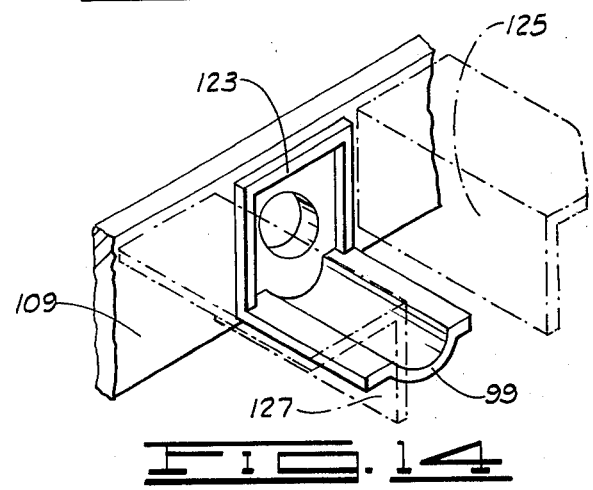
FIG. 14 is a perspective view of an alternate embodiment of a portion of the device shown in FIG. 11.
Figure 15:
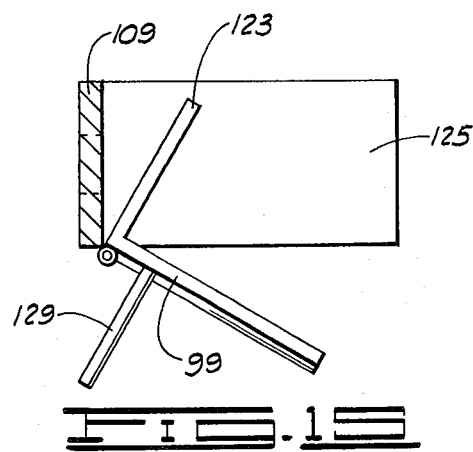
FIG. 15 is a partial side cross-sectional view of the embodiment shown in FIG. 14.

Referring now to FIGS. 14 and 15, an alternate embodiment of rest 99 is shown. In this embodiment rest 99 is connected to impact plate 109 by a hinge. Thus, instead of pivoting to the side, rest 99 pivots toward the front as shown in FIG. 15. Attached to the rear of rest 99 is a channel shaped bar 123 which extends above opening 121. Bar 123 extends about a nut positioned in opening 121 and pivots with rest 99 to encounter a nut which is jammed in opening 121. This frees the jammed nut and allows the nut to fall onto chute 114.

As shown in FIG. 14, this embodiment allows side plate 103 and retainer plate 111 to be replaced with stationary plate 125 and 127 which are attached to side walls 27 and 25 respectively. These plates retain the cracked pieces which fly away from the nut in the cracking process.

Because rest 99 pivots forwardly instead of to the side, a cam rod 129 is positioned beneath rest 99 in a different position than cam rod 105 shown in FIG. 11. This different pivoting action also requires that chute 114 be placed in a lower position and extend further beneath rest 99.

Figure 16:
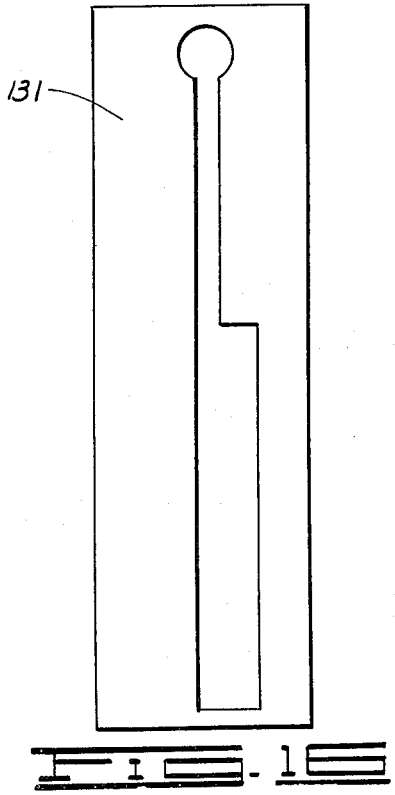
FIG. 16 is a front elevational view of a cover which can be utilized on the device shown in FIG. 1.

As shown in FIG. 16, a cover plate 131 can be provided for the front of nut cracker 21. This plate can be attached to side walls 25 and 27 and base 29. An opening is provided in cover plate 131 to allow the hammer arm 53 and flat spring 57 to pass through plate 131 during operation of the nut cracker 21.

In operation, the rotation crank 31 repeatedly draws and releases hammer arm 53 and transfers a nut from reservoir 39 to a nut cracking position on rest 99. The positions of pin 55 in disk 51, cam piece 65 on side wall 25, opening 91 in turntable 37 and drive rod 107 on shaft 83 determine the timing of the transferring of the nut and the drawing and release of hammer 53. Of course, this timing must be coordinated such that a nut is transferred into a nut cracking position on rest 99 prior to hammer arm 53 being released. Similarly, a cracked nut must be removed from rest 99 prior to the next nut being transferred from reservoir 39 to rest 99.

In operation, rotation of crank 31 causes turntable 37 to rotate until hole 91 extends beneath reservoir 39. As hole 91 extends beneath reservoir 39 a nut falls into hole 91. As shafts 49 and 83 continue to rotate, hammer arm 53 is engaged by pin 55 in disk 51. This draws hammer arm 53 against flat spring 57. As hammer arm 53 is drawn back, turntable 37 rotates to a position such that hole 91 is above the corresponding hole in fixed disk 35 allowing the nut in hole 91 to fall onto rest 99. The nut falls with the orientation provided in hole 91 and the groove in rest 99 maintains this orientation. This orientation is such that one end of the nut faces opening 121 in impact plate 109 and the other end of the nut faces hammer head 115. The height of rest 99 is such that the ends of the nut are in position to engage openings 117 and 121.

After the nut has fallen onto rest 99, the beveled head of pin 55 encounters cam piece 55 withdrawing the pin from contact with hammer arm 53. This causes flat spring 57 to throw hammer arm 53 forwardly such that hammer head 115 impacts the end of the nut residing on rest 99.

The impact of hammer head 115 moves the nut into contact with impact plate 109 and the impact force is distributed along a columnar portion of the nut cracking the sides of the nut. The ends of the nut expand outwardly.

The impact of hammer head 115 with the nut halts the movement of hammer arm 53. This causes spring arm 61 to urge hammer arm 53 back into contact with flat spring 57 which was halted in its forward movement by arm 63. At this time the nut is freely residing on rest 99 following the withdrawal of hammer head 115.

After hammer head 115 is withdrawn, drive rod 107 encounters cam rod 105. This causes rest 99 to pivot downwardly and the cracked nut falls from rest 99 onto chute 114. The nut falls downward along chute 114 until it falls from the end of chute 114. A basket or the like can be provided to receive the nut as it falls from chute 114.

As shaft 83 continues to rotate, drive rod 107 disengages from cam rod 105 and rest 99 springs upwardly to its horizontal position. The nut cracker 21 is now again in position for the process to be repeated.

If desired, the manual crank 31 can be replaced with a motor to provide the rotation of shaft 49.

As can be seen, the nut cracker of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. A nut cracking device comprising:
a first member having an opening for receiving the end of a nut therein such that a longitudinal columnar pressure can be applied to a nut disposed therein and into which opening the end of a nut can expand during cracking;
a hammer member having an opening for receiving the end of a nut therein such that a longitudinal columnar pressure can be applied to a nut disposed therein and into which opening the end of a nut can expand during cracking, said hammer member being disposed in relation to said first member such that a nut can be positioned longitudinally between the openings of said hammer member and said first member in the process of cracking a nut;
means for applying an impacting force to said hammer member to crack a nut disposed between said first member and said hammer member;
means for supporting a nut longitudinally between said first member and said hammer member;
means for automatically longitudinally positioning a nut on said supporting means comprising:
a turntable having a slot therein;
a plurality of pieces each of which removably fits in said slot and each having an opening sized for receiving a predetermined size and shape of nut therein and an longitudinal orientation for being received on said supporting means;
means for rotating said turntable;
a table above which said turntable rotates such that said table supports a nut received in said opening of a selected one of said pieces disposed in said turntable slot and having a hole disposed above said supporting means such that a nut will fall from said opening onto said supporting means; and
a reservoir disposed above said turntable for holding a plurality of nuts in communication with said turntable such that as said turntable rotates, nuts disposed in said reservoir will roll on said turntable and will be oriented by said rolling to be received in said opening as said opening rotates beneath said reservoir; and
means for automatically removing cracked nuts from said supporting means.

2. The device of claim 1 wherein said means for applying an impacting force to said hammer member comprises a spring.

3. The device of claim 2 which further includes means for automatically drawing and releasing said hammer member.

4. The device of claim 1 wherein said means for supporting a nut comprises a rest pivotally connected with respect to said first member.

5. The device of claim 4 wherein said means for automatically removing cracked nuts comprises means for pivoting said rest.

6. The device of claim 1 which further comprises a power means and wherein said hammer member, said automatic positioning means and said automatic removing means are each responsive to said power means.

7. The device of claim 6 which further comprises a frame and wherein said power means comprises a shaft journalled to said frame and means for rotating said shaft.

8. A nut cracking device comprising:

a frame;

a rest connected to said frame for receiving a nut in a nut cracking position;

means for cracking a nut disposed on said rest in a nut cracking position;

a turntable having a slot therein and rotatably connected to said frame;

a plurality of pieces each of which removably fits in said slot and each having an opening sized for receiving a predetermined size and shape of nut therein in an orientation for being received on said rest;

means for rotating said turntable;

a table above which said turntable rotates such that said table supports a nut received in said opening of a selected one of said pieces disposed in said turntable slot and having a hole disposed above said rest such that a nut will fall from said opening into said rest; and a reservoir disposed above said turntable for holding a plurality of nuts in communication with said turntable such that as said turntable rotates, nuts disposed in said reservoir will roll on said turntable and will be oriented by said rolling to be received in said opening as said opening rotates beneath said reservoir.

* * * * *